UNITED STATES PATENT OFFICE.

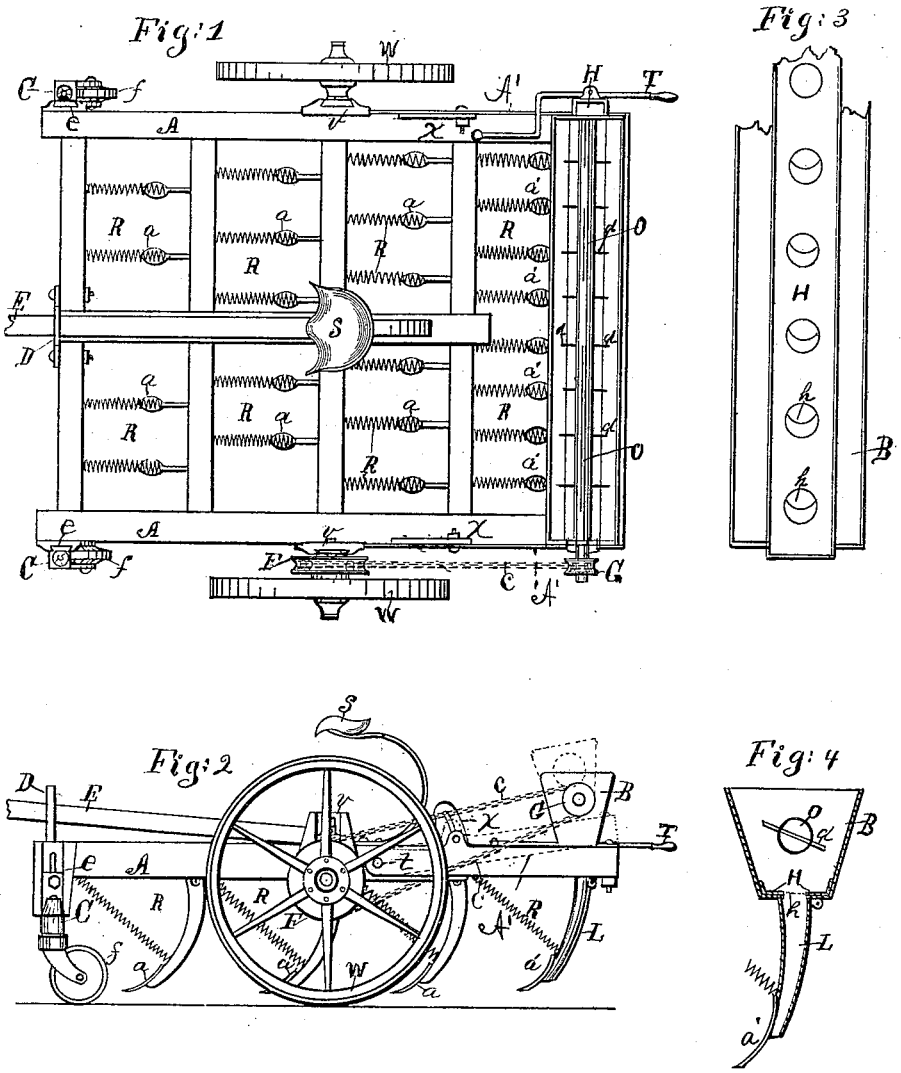

JAMES D. CHICHESTER, OF CHARLESTON, MICHIGAN.

COMBINED CULTIVATOR AND SEEDER.

SPECIFICATION forming part of Letters Patent No. 234,390, dated November 16, 1880.

Application filed February 10, 1880.

*To all whom it may concern:*

Be it known that I, JAMES D. CHICHESTER, of Charleston, county of Kalamazoo, State of Michigan, have invented new and useful Improvements in Combination Cultivators and Seeders, of which the following is a specification.

My invention has for its object the construction of a device for the cultivation and seeding of the soil, either separately or conjointly.

In the accompanying drawings, forming a part of this specification, Figure 1 is a top view; Fig. 2, a side elevation; Fig. 3, inside view of bottom of grain-box, and Fig. 4 cross-sectional view of the grain-box with drill-tooth attached.

*a a* are the teeth, which are hinged to the under face of the girts by means of staples and bolts, as shown in Figs. 2 and 4. Coil-springs R are secured to the teeth-bars *a a* near the bottom of front face, the upper ends of springs R being secured to under face of frame and girts. By this construction the teeth oscillate with the same effectual movement of steel curved spring-teeth, and are much cheaper, as they may be of all iron.

L are the drill-teeth, which I hinge in the same manner, their construction being the same in effect, except they are hollow, like other drill-teeth.

To each of the front corners of the frame-beams A A are located swiveled wheels capable of being lowered or raised by fitting their standards into sockets *e* or grooves, through which are cut slots, into which a bolt is inserted, which holds the wheel at any desired location. The advantage of the wheels being swiveled for use on a cultivator with the style of frame shown is that in turning about the wheels follow in a parallel angle to the sweep of the frame, which would be very cumbersome without their use. The wheels W are placed on axles which have upwardly-extending flanges, which fit into a groove or receptacle, V, on each side of frame-beams A. This receptacle has a slot through it, into which a bolt is inserted, which passes through the projection of the axle, by which means the frame is held at a given height, on the same principle of the swiveled wheels C at *e*, Fig. 2.

D is a slotted plate through which the tongue E is placed. The back end of the tongue being hinged to a girt, and the slot D being elongated perpendicularly, the frame rises or lowers with the unevenness of the soil, while the tongue remains in its natural position.

S is the seat; F and G, pulleys for revolving the grain-agitator O in the grain-box B; *c*, chain or belt; and H the bottom slide of grain-box B, for governing the amount of grain sown. T is a handle for setting the same.

The grain-box B is adjustable to the frame A of the cultivator by means of bars A′, firmly secured to each end of the drill-frame, and by means of slotted plate and adjusting-bolts X and holes and pivot-bolts *t*. The slotted plate and bolt X not only assist in holding the drill in position, but also admit of raising the grain-box or drill up, as indicated by dotted lines in Fig. 2, to govern the depth to which the drill-teeth enter the soil. By the above construction and arrangement the drill-box B may be temporarily adjusted to the cultivator to seed the ground after the soil has been nearly prepared by the cultivator, in which case teeth *a′* of the drill may be dispensed with, only using tubes to convey the seed to the soil, if desired. Thus, a field having been once or twice cultivated previous to seeding, and needing another like operation before the seed is deposited in the soil, by adjusting the drill to the cultivator the seeding may be done at the same time of the last cultivating, thus saving once going over the field with the team, which, in a field of one hundred acres, is deemed of vital advantage.

What I claim as new, and desire to secure by Letters Patent, is—

The combination, with a wheel harrow or cultivator, of the grain-box B, bars A′ A′, slotted plates and adjusting-bolts X, and removable pivoted bolts *t*, substantially as and for the purpose specified.

JAMES D. CHICHESTER.

Witnesses:
DANIEL BISHOP,
C. B. GROVER.